Oct. 28, 1924.                                                   1,513,216
                          C. BOHLSSEN
              HEADLIGHT DIMMER FOR AUTOMOBILE HEADLIGHTS
                       Filed Aug. 2, 1923
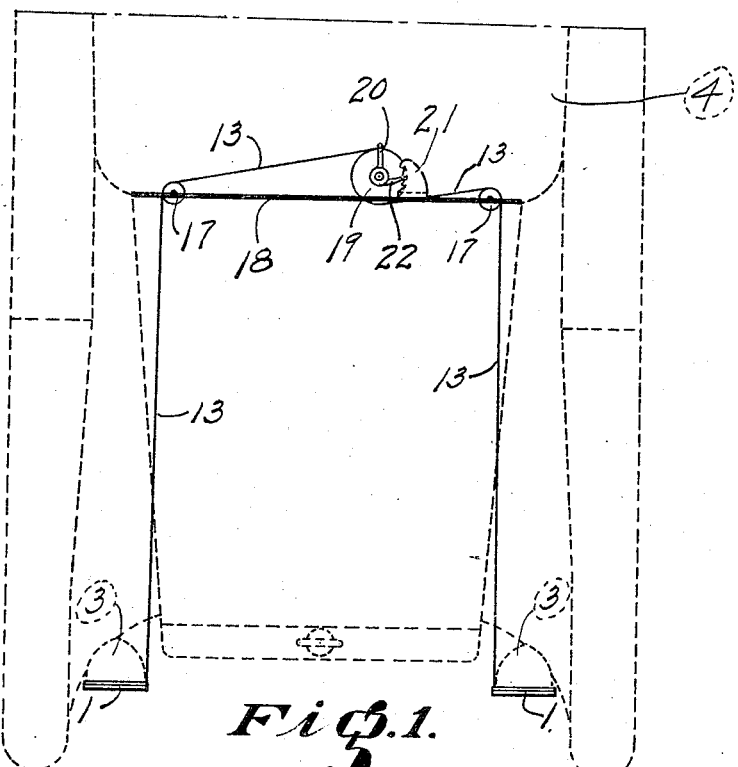
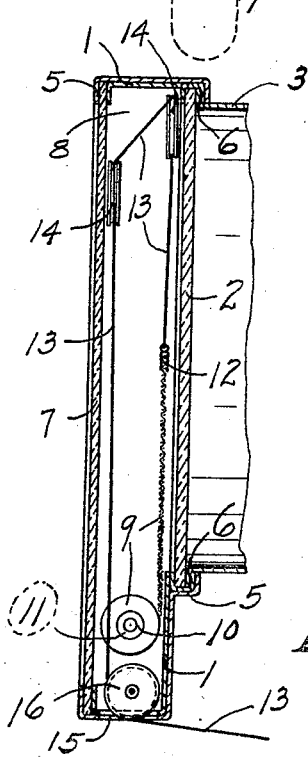
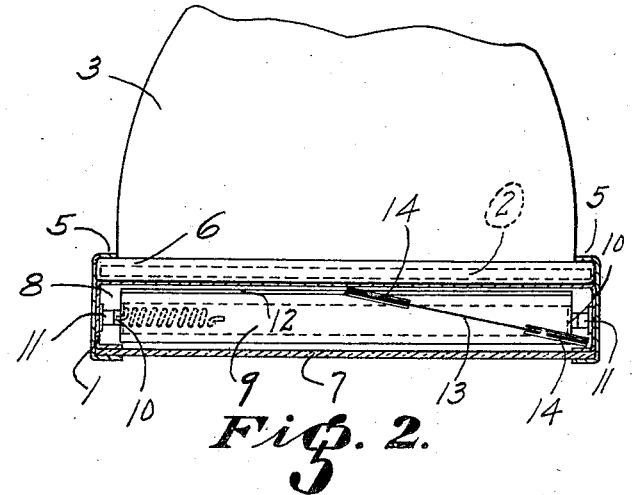
INVENTOR
Christian Bohlssen
BY
Adam E. Fisher
ATTORNEY Patented Oct. 28, 1924.

1,513,216

UNITED STATES PATENT OFFICE.

CHRISTIAN BOHLSSEN, OF OSHKOSH, WISCONSIN.

HEADLIGHT DIMMER FOR AUTOMOBILE HEADLIGHTS.

Application filed August 2, 1923. Serial No. 655,252.

*To all whom it may concern:*

Be it known that I, CHRISTIAN BOHLSSEN, a citizen of the United States, residing in the city of Oshkosh, county of Winnebago, and State of Wisconsin, have invented new and useful Improvements in Headlight Dimmers for Automobile Headlights, of which the following is a specification, reference being had to the accompanying drawings.

This invention is in the way of a headlight dimmer for automobile headlights, and the object is to provide a dimmer element consisting of a shade adjustably disposed over the lower part of the lens of the headlight with means for raising or lowering same, as desired. In the usual cupped form of headlight reflector, the light rays are reflected from the lower faces of the reflector outwardly, upwardly and forwardly, away from the road, and it is these rays which strike the eyes of the driver of an approaching automobile and confuse him. On the other hand, the light rays reflected from the upper surfaces of the reflector are thrown outwardly, downwardly and forwardly onto the road, and it is these rays only which are of service to the driver in operating his car.

The object of this invention may be stated in another way, therefore, in that it is designed to do away with the first mentioned upward and glaring light rays by means of a shade adapted to adjustably cover the lower part of the lens of the headlight, and so obstruct those light rays, leaving only the serviceable rays to be emitted from the upper faces of the reflector.

A still further object is to provide means whereby the said shade may be manipulated from the dash of the automobile.

In the drawing

Figure 1 is a plan view;

Figure 2 is a horizontal section through one of the headlights equipped with the improvement;

Figure 3 is a vertical section through one of the headlights equipped with the improvement.

The invention consists in mounting auxiliary frames 1 at the front of the main lenses of the usual headlights 3 of the automobile 4. These frames may be made of sheet metal, pressed and stamped to form. They embody side, top and bottom flanges 5 adapted to frictionally engage the main frames 6 of the headlights 3, and auxiliary lenses 7, which stand spaced from the main lenses 2, leaving curtain ways 8 between. Fabric shades 9 are mounted on spring set rollers 10 journaled at 11 transversely in the lower portions of the curtain ways 8. Stiffening strips 12 are secured to the upper edges of the shades 9, and cords 13 are attached to these strips and extend thence upwardly over pulleys 14 journaled in the upper portions of the curtain ways 8, and thence down through openings 15 in the lower flanges of the frames 1, and over pulleys 16 journaled in these openings. Thence the cords are run back and over pulleys 17 journaled on the automobile at points immediately under the dash 18, and finally the cords are attached to the spindle 19 journaled through the dash 18. A crank 20 is rigidly secured to the spindle 19 and adapted to turn upon the dash 18. A circular ratchet 21 is mounted on the dash, and a pawl 22 mounted on the crank 20 and working in this ratchet enables the driver to raise or lower the shades 9 and lock them in any position desired. The cords 13 may be enclosed in tubes if desired, as means of protection but there would be no novelty involved in this feature.

The operation and use of the device is apparent from the foregoing description.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In combination with an automobile headlight, a device of the kind described, comprising an auxiliary lens set in an auxiliary frame, the latter being adapted to attach at the front of the headlight with a space forming a curtain way left between the lenses; a spring set roller journaled in the lower portion of the curtain way; a shade on the roller; two pulleys journaled in the top of the frame, one at the center and the other at the side thereof and angularly set and directed toward front and to one side of the frame; a pulley journaled at the bottom and to one side of the frame in alignment with the upper side pulley; and a cord secured to the center top end of the shade and trained up over the upper central pulley, thence over the upper side pulley, thence down over the lower side pulley, and thence to the hand of the operator.

2. In combination with an automobile headlight, a device of the kind described, comprising an auxiliary lens set in an auxiliary frame, the latter being adapted to attach at the front of the headlight casing, with a space forming a curtain way left between the lenses; a spring set roller journaled in the lower portion of the curtain way; a shade mounted on the roller; two pulleys journaled in the top of the frame, one at the center and the other at the side thereof and angularly set and directed towards the front and to one side of the frame; a pulley journaled at the bottom and to one side of the frame in alignment with the upper side pulley; a spindle and crank journaled on the dash of the automobile; a cord secured to the center top end of the shade and led up over the upper central pulley, the upper side pulley, down over the lower side pulley and back to and attached to the said spindle; and means for locking the spindle and crank at any desired point.

CHRISTIAN BOHLSSEN.

Witnesses:
PAUL REDEMANN,
E. WOHLT.